Dec. 1, 1942. S. R. REIMEL ET AL 2,303,762
CONVEYER BELT
Filed Aug. 22, 1941
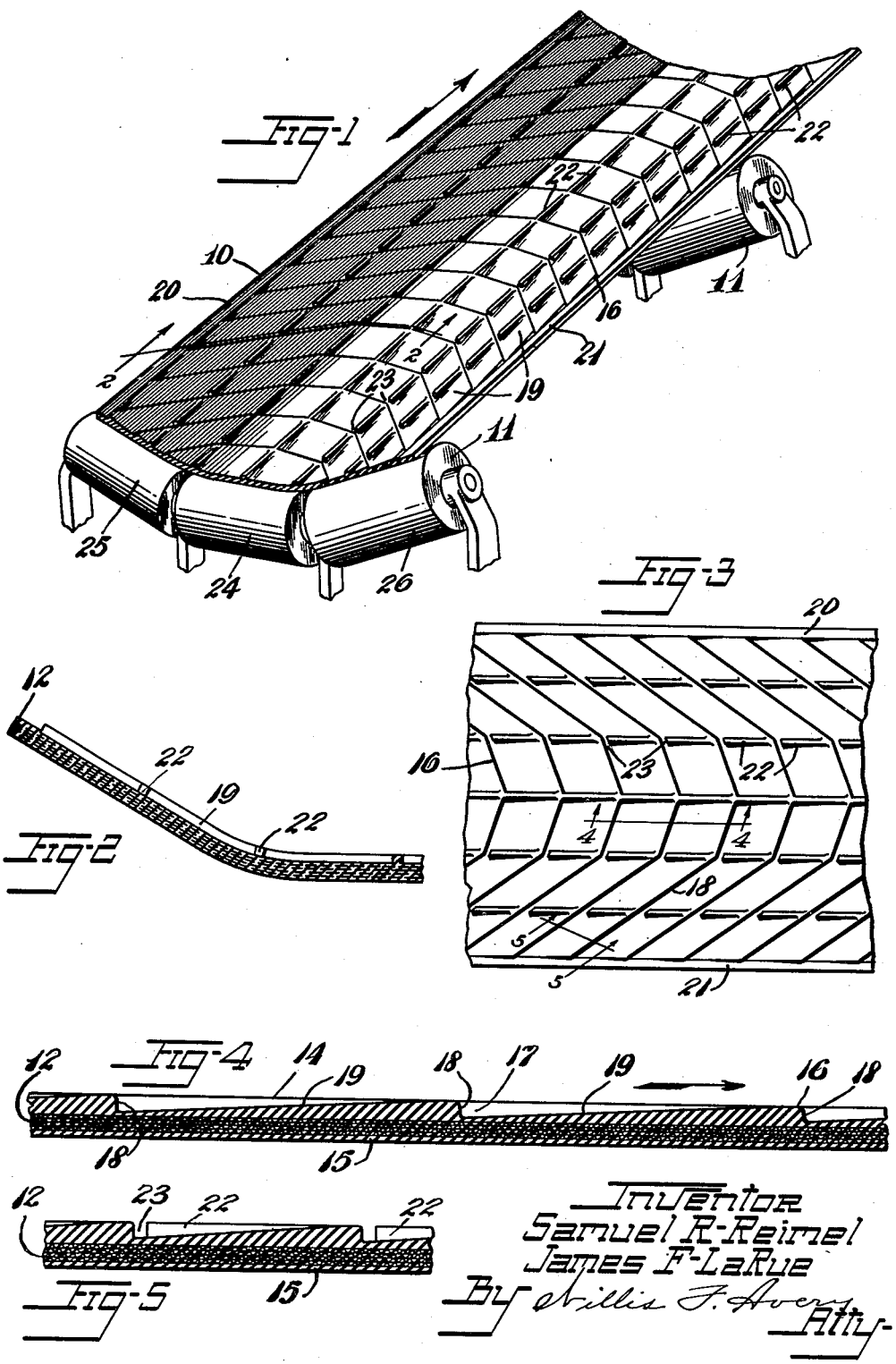
Inventor
Samuel R. Reimel
James F. LaRue
By Willis F. Avery
Atty.

Patented Dec. 1, 1942

2,303,762

UNITED STATES PATENT OFFICE 2,303,762

CONVEYER BELT

Samuel R. Reimel, Akron, and James F. La Rue, Cuyahoga Falls, Ohio, assignors to The B. F. Goodrich Company, New York, N. Y., a corporation of New York Application August 22, 1941, Serial No. 407,858

11 Claims. (Cl. 198—198)

This invention relates to conveyer belts and is especially useful where wet materials and liquids are to be handled.

In the handling of fine grained materials such as sand and crushed ores containing a larger amount of water or other liquid the conveyer belt usually has been troughed so that the liquid has had a tendency to run to the center of the belt, and the prior belts have failed to distribute the liquid uniformly over the width of the belt.

The present invention aims to overcome these and other difficulties and to provide an improved construction.

The principal objects of the invention are to distribute the liquid and other material more uniformly over the face of the belt, to provide improved lifting power, to provide high flexibility, to provide greater traction, to provide a high degree of resistance to wear, to provide good distribution of the load, and to provide a long-lived structure.

These and other objects will appear from the following description and the accompanying drawing.

Of the drawing:

Fig. 1 is a perspective view of a portion of a conveyer belt and its support constructed according to and embodying the invention in its preferred form, parts being broken away.

Fig. 2 is a cross section of the belt taken on line 2—2 of Fig. 1, parts being broken away.

Fig. 3 is a plan view of the belt of Fig. 1, parts being broken away.

Fig. 4 is a longitudinal sectional view taken on line 4—4 of Fig. 3, parts being broken away.

Fig. 5 is a sectional view taken on line 5—5 of Fig. 3, parts being broken away.

In accordance with the invention a belt comprising a conveying surface, preferably of rubber or other rubber-like material, is formed with cross ridges separated by grooves, the ridges and grooves being inclined progressively with respect to the longitudinal axis of the belt from its center toward its margins with the inclination of the ridges being rearwardly with respect to the direction of travel of the belt. The cross grooves are preferably constructed with abrupt sides facing in the direction of travel and inclined surfaces in the opposite direction. The ridges may terminate at marginal curbs of the belt. Resistance to lateral spreading of the material on the belt and increased traction are provided by spaced-apart longitudinally extending ribs, and flexibility of the belt is maintained by interrupting the longitudinal ribs at the abrupt sides of the cross grooves. These ribs also provide surfaces for contacting guide pulleys. Curbs at the margins of the belt may be employed to return distributed materials toward the center of the belt and prevent loss of fluid or finely ground material, although where it is desired these curbs may be omitteed to permit fluids to drain at the lateral margins of the belt.

Referring to the drawing, illustrative of an embodiment of the invention, the numeral 10 designates a belt which is supported upon troughing roller supports 11 and is driven by any suitable means, not shown, in the direction of the arrows, indicated in Figs. 1 and 4. The belt 10 has a body 12 which may be of rubberized fabric or cord material to provide the necessary strength and has a thick wear surface 14 preferably of vulcanized rubber or other rubber-like material. A layer 15 of rubber-like material provides a wearing surface to contact with the supporting pulleys and the edges of the belt also are preferably enclosed by rubber-like material.

The wear surface 14 is formed with spaced apart ridges 16 which extend crosswise of the belt and are defined by cross grooves 17 each having one abrupt side 18 facing the direction of travel and approximately perpendicular to the belt face, and one long sloping side 19, so that the ridges are of saw tooth cross section, as seen in Figs. 4 and 5. Each ridge is inclined progressively from the center of the belt to its margins where they terminate in curbs 20, 21, preferably of less elevation than the ridges 16.

To provide for smooth running over return idlers and drive pulleys contacting the faces and to distribute stresses more uniformly, longitudinal ribs 22 equal in elevation to the ridges 16 are provided at spaced-apart intervals along the ridges 16. These, with the exception of a central rib, are interrupted as at 23 by notches at the deepest positions of the cross grooves to permit cross flow of liquid across the belt away from its center and to provide increased flexibility. The inclination of the ridges 16 to the axis of the belt is preferably moderate throughout the central portion of the belt where it travels over supporting rollers 24 having horizontal faces, but is increased at the side zones of the belt over the troughing rollers 25, 26.

The result of such inclination is such that substantially the same fall of the cross grooves may be provided across the face of the belt for a given inclination of the belt longitudinally combined with its crosswise inclination due to the troughing of the supporting rollers. The total effect is such that when liquid is poured on the central zone of the belt, it may spread across the belt face and prevents a torrent down the center of the belt which would wash down the sand or other material thereon. At the margins of the belt, the grooves terminate so that liquid is spilled to the next lower groove and toward the center.

Good results have been accomplished by so inclining the grooves of the belt that with a longitudinal inclination of the belt of 15° to the horizontal and an incline of the troughing roller 25, 26 of 20° to the horizontal, the grooves are substantially level with only slight incline toward the margins of the belt.

The saw-toothed or shingled contour of the belt, longitudinally thereof, provides great resistance to wear and excellent carrying ability without slippage of the load and the cross-groove inclination distributes the liquid part of the load over the belt face uniformly.

Belts of this construction have been found to have special advantage in the conveying of wet metal-bearing sands as in the dredge process of gold mining.

When it is desired to drain all liquids from the conveyed material, as in handling wet sand, the curbs 20, 21 may be omitted so that the liquid spills at the edges of the belt.

While the belt is particularly useful in elevating materials, it may also be run in the opposite direction for conveying materials downwardly in which case the saw tooth ridges resist slipping of the material, especially when the belt is stopped suddenly. The saw tooth form of the ridges provides great strength and resistance to wear.

Variations may be made without departing from the scope of the invention as it is defined by the following claims:

We claim:

1. A wet-material conveyer belt having a direction of advance for operation in troughed shape up an incline, said belt comprising a work-supporting face of rubber-like material, cross-ridges on said face at longitudinally spaced-apart positions along the belt, each ridge terminating short of the side margins of the belt and comprising an abrupt lifting face diverging from an intermediate longitudinal zone of the belt rearwardly of said direction of advance toward its side margins, and marginal portions of appreciable width and of less depth than said ridges for effecting spill of liquid from the ends of the ridges to the lifting faces of succeeding ridges rearwardly thereof.

2. A wet-material conveyer belt having a direction of advance for operation in troughed shape up an incline, said belt comprising a work-supporting face of rubber-like material, cross-ridges on said face at longitudinally spaced-apart positions along the belt, each ridge terminating short of the side margins of the belt and comprising an abrupt advance lifting face and a sloping rear supporting face, the advance lifting face of each ridge diverging from an intermediate longitudinal zone of the belt rearwardly of said direction of advance toward its side margins, and marginal portions of appreciable width and of less depth than said ridges for effecting spill of liquid from the ends of the ridges to the lifting faces of succeeding ridges rearwardly thereof.

3. A wet-material conveyer belt having a direction of advance for operation in troughed shape up an incline, said belt comprising a work-supporting face of rubber-like material, cross-ridges on said face at longitudinally spaced-apart positions along the belt, each ridge terminating short of the side margins of the belt and comprising an abrupt advance lifting face and a sloping rear supporting face, the advance lifting face of each ridge diverging from an intermediate longitudinal zone of the belt rearwardly of said direction of advance toward its side margins, marginal portions of appreciable width and of less depth than said ridges for effecting spill of liquid from the ends of the ridges to the lifting faces of succeeding ridges rearwardly thereof, and rib means on said supporting faces of a depth substantially equal to said ridges for bearing upon return idler pulleys.

4. A wet-material conveyer belt having a direction of advance for operation in troughed shape up an incline, said belt comprising a work-supporting face of rubber-like material, cross-ridges on said face at longitudinally spaced-apart positions along the belt, each ridge terminating short of the side margins of the belt and comprising an abrupt advance lifting face and a rear sloping supporting face, the advance lifting face of each ridge diverging from an intermediate longitudinal zone of the belt rearwardly of said direction of advance toward its side margins, marginal portions of appreciable width and of less depth than said ridges for effecting spill of liquid from the ends of the ridges to the lifting faces of succeeding ridges rearwardly thereof, and a central longitudinal continuous rib on said face and of a depth substantially equal to said ridges for bearing upon return idler pulleys.

5. A wet-material conveyer belt having a direction of advance for operation in troughed shape up an incline, said belt comprising a work-supporting face of rubber-like material, cross-ridges on said face at longitudinally spaced-apart positions along the belt, each ridge terminating short of the side margins of the belt and comprising an abrupt advance lifting face and a sloping rear supporting face, the lifting face of each ridge diverging from an intermediate longitudinal zone of the belt rearwardly of said direction of advance toward its side margins, marginal portions of appreciable width and less depth than said ridges for effecting spill of liquid from the ends of the ridges to the lifting faces of succeeding ridges rearwardly thereof, a central longitudinal continuous rib on said face and of a depth substantially equal to said ridges, and projections on said supporting faces laterally spaced from said rib of a depth substantially equal to said ridges and terminating short of said advance lifting faces to provide space permitting flow of liquid along said advance lifting faces to said borders.

6. In a conveyer apparatus in which a conveyer belt is movably mounted for advance of a troughed reach thereof up an incline to lift wet material, a conveyer belt therefor comprising a work-supporting face of rubber-like material, cross-ridges on said face at longitudinally spaced-apart positions along the belt and each ridge comprising an abrupt advance lifting face, each ridge being approximately level in the inclined and troughed lifting reach of the belt throughout the lateral extent of the ridge to reduce concentration of liquid in the cental region of the belt.

7. In a conveyer apparatus in which a conveyer belt is movably mounted for advance of a troughed reach thereof up an incline to lift wet material, a conveyer belt therefor comprising a work-supporting face of rubber-like material, cross-ridges on said face at longitudinally spaced-apart positions along the belt and each ridge comprising an abrupt advance lifting face and a sloping rear supporting face, each ridge being approximately level in the inclined and troughed lifting reach of the belt throughout the lateral extent of the ridge to reduce concentration of liquid in the central region of the belt.

8. In a conveyer apparatus in which a conveyer belt is movably mounted for advance of a troughed reach thereof up an incline to lift wet material, a conveyer belt therefor comprising a work-supporting face of rubber-like material, cross-ridges on said face at longitudinally spaced-apart positions along the belt, each ridge terminating short of the side margins of the belt, each ridge diverging from an intermediate longitudinal zone of the belt rearwardly and toward its side margins at an angle to provide in the troughed lifting reach of the belt an approximately level condition of each ridge throughout the lateral extent thereof to reduce concentration of liquid at the central region of the belt, and marginal portions of the belt of appreciable width and of less depth than said ridges for effecting spill of liquid from the ends of the ridges to the ridges rearwardly thereof.

9. In a conveyer apparatus in which a conveyer belt is movably mounted for advance of a troughed reach thereof up an incline to lift wet material, a conveyer belt therefor comprising a work-supporting face of rubber-like material, cross-ridges on said face at longitudinally spaced-apart positions along the belt, each ridge terminating short of the side margins of the belt and comprising an abrupt advance lifting face and a sloping rear supporting face, the lifting face of each ridge diverging from an intermediate longitudinal zone of the belt rearwardly and toward its side margins at an angle to provide in the troughed lifting reach of the belt an approximately level condition of each ridge throughout the lateral extent thereof to reduce concentration of liquid at the central region of the belt, and marginal portions of appreciable width and of less depth than said ridges for effecting spill of liquid from the ends of the ridges to the lifting faces of succeeding ridges rearwardly thereof.

10. In a conveyer apparatus in which a conveyer belt is movably mounted for advance of a troughed reach thereof up an incline to lift wet material, a conveyer belt therefor comprising a work-supporting face of rubber-like material, cross-ridges on said face at longitudinally spaced-apart positions along the belt, each ridge terminating short of the side margins of the belt and comprising an abrupt advance lifting face and a sloping rear supporting face, the lifting face of each ridge diverging from an intermediate longitudinal zone of the belt rearwardly and toward its longitudinal margins at an angle to provide in the troughed lifting reach of the belt an approximately level condition of each ridge throughout the lateral extent thereof to reduce concentration of liquid at the central region of the belt, marginal portions of the belt of appreciable width and of less depth than said ridges for effecting spill from the ends of the ridges to the lifting faces of succeeding ridges rearwardly thereof, and rib means on said supporting faces and of a depth substantially equal to said ridges for bearing upon idler pulleys in the return reach of the belt.

11. In a conveyer apparatus in which a conveyer belt is movably mounted for advance of a troughed reach thereof up an incline to lift wet material, a conveyer belt therefor comprising a work-supporting face of rubber-like material, cross-ridges on said face at longitudinally spaced-apart positions along the belt, each ridge terminating short of the side margins of the belt and comprising an abrupt advance lifting face and a sloping rear supporting face, the lifting face of each ridge diverging from an intermediate longitudinal zone of the belt rearwardly and toward its side margins at an angle to provide in the troughed lifting reach of the belt an approximately level condition of each ridge throughout the lateral extent thereof to reduce concentration of liquid at the central region of the belt, marginal portions of appreciable width and of less depth than said ridges for effecting spill of liquid from the ends of the ridges to the lifting faces of succeeding ridges rearwardly thereof, a central longitudinal rib on said face and other ribs laterally spaced therefrom all of a depth substantially equal to said ridges for bearing upon return idlers, the laterally spaced ribs terminating short of the advance lifting faces of said ridges providing passage for liquid along said faces.

SAMUEL R. REIMEL.
JAMES F. LA RUE.